US009536266B2

(12) United States Patent
Ploesser et al.

(10) Patent No.: US 9,536,266 B2
(45) Date of Patent: Jan. 3, 2017

(54) FACT CHECKER ENGINE (75) Inventors: Karsten Ploesser, Bulomba (DE); Alexander Dreiling, Qld (DE)

(73) Assignee: SAP SE, Walldorf (DE)

( * ) Notice: Subject to any disclaimer, the term of this patent is extended or adjusted under 35 U.S.C. 154(b) by 687 days.

(21) Appl. No.: 13/564,119

(22) Filed: Aug. 1, 2012

(65) Prior Publication Data
US 2014/0040249 A1    Feb. 6, 2014

(51) Int. Cl.
G06F 17/30 (2006.01)
G06Q 40/08 (2012.01)
G06Q 10/10 (2012.01)

(52) U.S. Cl.
CPC ......... *G06Q 40/08* (2013.01); *G06F 17/30634* (2013.01); *G06F 17/30637* (2013.01); *G06F 17/30684* (2013.01); *G06F 17/30737* (2013.01); *G06F 17/30752* (2013.01); *G06Q 10/10* (2013.01)

(58) Field of Classification Search
CPC .... G06F 17/00; G06F 17/30; G06F 17/30752; G06F 17/30864; G06F 17/30867; G06F 17/3061; G06F 17/30616; G06F 17/30637; G06F 17/30634; G06F 17/30657; G06F 17/30684; G06F 17/30737
USPC ............... 707/601–602, 607–609, 688, 694, 707/705–709, 723, 730, 736, 707/748–754, 758–759, 765–771, 779, 707/803–807; 715/727–728, 741, 743, 715/748; 345/593–594, 345/650; 705/1.1, 705/7.39–7.41, 14.52–14.55, 300–302, 705/304, 311, 341–342, 346–347
See application file for complete search history.

(56) References Cited

U.S. PATENT DOCUMENTS

| | | | | |
|---|---|---|---|---|
| 6,810,383 | B1 * | 10/2004 | Loveland | 705/7.13 |
| 7,953,615 | B2 * | 5/2011 | Aquila et al. | 705/4 |
| 8,655,866 | B1 * | 2/2014 | Provine et al. | 707/713 |
| 2002/0035488 | A1 * | 3/2002 | Aquila et al. | 705/4 |
| 2004/0093242 | A1 * | 5/2004 | Cadigan et al. | 705/4 |
| 2007/0282639 | A1 * | 12/2007 | Leszuk et al. | 705/4 |
| 2009/0216803 | A1 * | 8/2009 | Goldfarb | 707/104.1 |
| 2009/0287509 | A1 * | 11/2009 | Basak et al. | 705/4 |
| 2012/0096384 | A1 * | 4/2012 | Albert et al. | 715/772 |

FOREIGN PATENT DOCUMENTS

WO    WO 02/01460    * 1/2002

* cited by examiner

Primary Examiner — Srirama Channavajjala
(74) Attorney, Agent, or Firm — Fish & Richardson P.C.

(57) ABSTRACT

Methods, systems, and computer-readable storage media for automatically checking and acting on one or more claims. Implementations include actions of receiving claim information associated with one or more claims, wherein each of the one or more claims includes a factual claim, processing the claim information based on a domain vocabulary to identify at least one of one or more keywords and one or more categories, for each claim of the one or more claims: identifying one or more facts relevant to the claim, and determining an accuracy of the claim based on the one or more facts generating a confidence score reflecting an overall confidence in the one or more claims based on respective accuracies, and transmitting at least one of the one or more claims and the confidence score for display in a graphical user interface (GUI).

20 Claims, 5 Drawing Sheets

FACT CHECKER ENGINE

BACKGROUND

In many consumer-facing industries (e.g., insurance, banking, retail, healthcare, public services), consumers can be in direct communication with a customer service representative. In some examples, the customer service representative collects information from the customer in order for decisions to be taken based on the provided information. Organizations, however, must guard against the risk of taking action based on incorrect information provided by the customer. Consequently, the verification of information is often delegated to a centralized authority. For example, in the insurance industry, customer claims collected by a user-facing customer service representative are delegated to an expert in claims analysis. This results in delays and overheads as information is transmitted and analyzed. Further, customer service representatives often work from a script in order to ensure that necessary information is collected from the customer. Following a script, however, can hinder focusing on the natural flow of the conversation between the customer and the customer service representative.

SUMMARY

Implementations of the present disclosure include computer-implemented methods for automatically checking and acting on one or more claims. In some implementations, receiving, at the one or more processors, claim information associated with one or more claims, wherein each of the one or more claims includes a factual claim, processing, using the one or more processors, the claim information based on a domain vocabulary to identify at least one of one or more keywords and one or more categories, for each claim of the one or more claims: identifying one or more facts relevant to the claim, and determining an accuracy of the claim based on the one or more facts generating, using the one or more processors, a confidence score reflecting an overall confidence in the one or more claims based on respective accuracies, and transmitting at least one of the one or more claims and the confidence score for display in a graphical user interface (GUI).

In some implementations, actions further include identifying one or more actions based on one or more of the one or more claims, the one or more facts and the confidence score, and transmitting the one or more actions for display in the GUI.

In some implementations, identifying one or more actions is further based on an authorization level of a user providing claim information, each action of the one or more actions including an action that the user is authorized to execute.

In some implementations, actions further include receiving user input indicating selection of at least one action of the one or more actions, and in response to receiving the user input, invoking the at least one action.

In some implementations, identifying one or more facts relevant to the claim includes accessing a fact database based on one or more keywords associated with the claim, and retrieving the one or more facts from the fact database.

In some implementations, identifying one or more facts relevant to the claim includes: generating one or more queries based on one or more keywords associated with the claim, querying one or more context sources based on the one or more queries, and receiving the one or more facts in response to querying the one or more context sources.

In some implementations, the claim information is provided from one or more input sources.

In some implementations, the one or more input sources include one or more of a user that inputs claim information into the GUI, an audio file, an image file, an email message, an instant message and a text message.

In some implementations, the domain vocabulary provides one or more terms and, for each term of the one or more terms, provides at least one of a definition of the term, a range of permissible values of the term, and a category to which the term is associated.

In some implementations, processing the claim information based on the domain vocabulary includes comparing each term provided in the claim information to the one or more terms provided in the domain vocabulary, wherein when a term of the claim information matches a term in the domain vocabulary, the term of the claim information is identified as a keyword.

In some implementations, actions further include, for each claim of the one or more claims, transmitting instructions to display the claim in the GUI.

In some implementations, the instructions further include instructions to display a graphical representation of the accuracy of the claim.

In some implementations, actions further include transmitting instructions to display at least one fact associated with the claim in the GUI.

In some implementations, the instructions to display at least one fact associated with the claim in the GUI are transmitted in response to user input.

In some implementations, the user input includes user interaction with the claim displayed in the GUI.

In some implementations, the confidence score is determined as a ratio between a number of claims that are determined to be accurate and a total number of claims.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to a fact checker system that enables real-time verification of customer information and execution of actions based on the customer information. More specifically, implementations provide for automatic retrieval of accurate context information based on customer-provided information to increase the reliability of decisions taken by a user. In some examples, the user can include a customer service representative (CSR) (e.g., an insurance claims agent, a sales agent). In some implementations, one or more actions are suggested to the user based on the collected information. The user is able to select actions for execution. In some implementations, a confidence score is provided to the user. In some examples, the confidence score reflects an overall confidence in the customer-provided information and can be derived based on a comparison between the customer-provided information and corresponding objective facts.

In some implementations, the fact checker system includes a graphical user interface (GUI), a fact checker engine, a claim base, an action base, a fact base and a domain vocabulary. As discussed in further detail herein, the user can interact with the fact checker engine through the GUI to, for example, input customer-provided information. The fact checker engine can process the customer-provided information based on information stored in each of the claim base, the action base, the fact base and the domain vocabulary to suggest the one or more actions to the user and/or to provide the confidence score.

Figure 1:
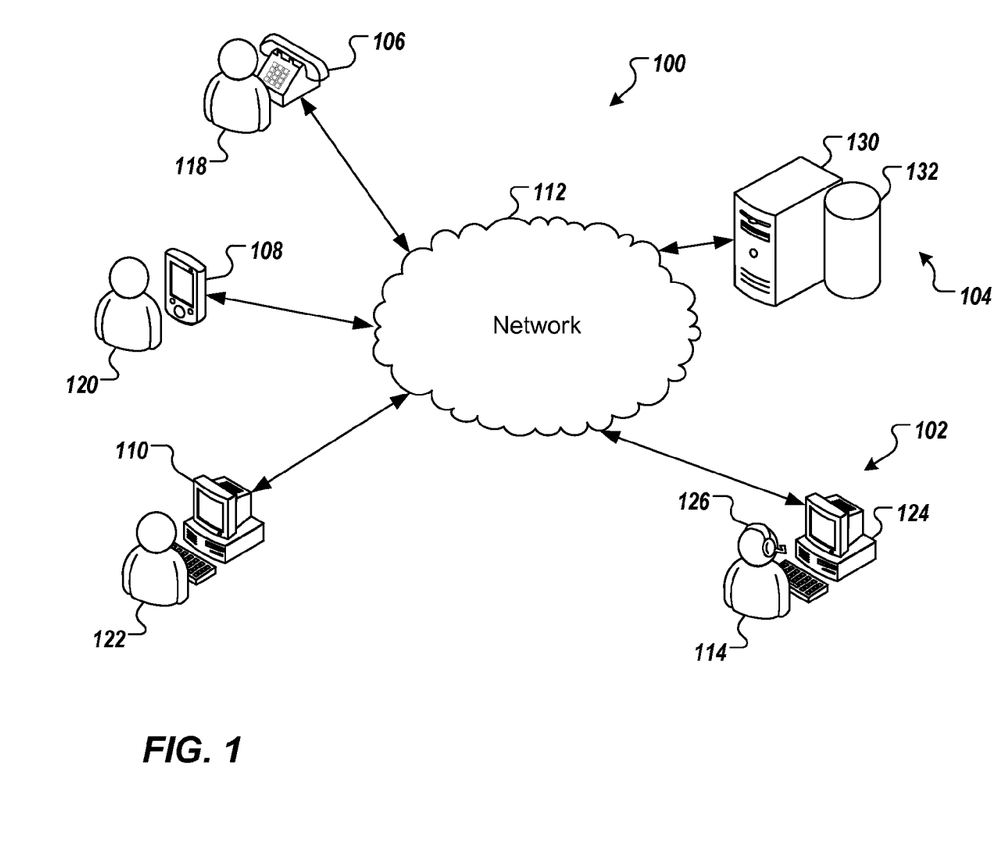
FIG. 1 depicts an example system that can execute implementations of the present disclosure.

FIG. 1 depicts an example system 100 that can be used in implementations of the present disclosure. The example system 100 includes a user workstation 102, a server system 104, communication devices 106, 108, 110 and a network 112. In the depicted example, the user workstation 102 includes an attendant user 114 and the communication devices 106, 108, 110 include respective users 118, 120, 122. In an example context, discussed in further detail below, the user 114 can include a claims agent of an insurance company and each of the users 118, 120, 122 can include customers of the insurance company.

In the depicted example, the user workstation 102 includes a computing device 124 and a communication device 126. In some examples, the computing device 124 and the communication device 126 can be provided as a single device. In the depicted example, each of the computing device 124 and/or the communication device 126 can communicate with each of the communication devices 118, 120, 122 over the network 112.

In some examples, each of the communication devices 118, 120, 122 can include any appropriate type of communication device and/or computing device such as a telephone, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some examples, the computing device 124 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some examples, the communication device 126 can include any appropriate type of communication device or system, such as a telephone, a smart phone, an email device, a chatting device, voice over IP and/or any other appropriate type of communication system.

In some implementations, the network 112 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes a server 130 and a data store 134, and is intended to represent various forms of servers including, but not limited to a web server, an application server, a proxy server, a network server, and/or a server pool. In general, the server system 104 accepts user requests for application services and provides such services to any number of client devices (e.g., the computing device 124) over the network 112.

In some implementations, software can be stored in memory of each of the computing devices to provide instructions to a processor (not shown) to perform various functions in accordance with implementations of the present disclosure. For example, the computing device 124 can store and execute software, such as an operating system and/or application programs. In some examples, one or more application programs used by a computing device can include computer executable instructions for invoking user functionality related to communication, such as email, chat, short message service (SMS) and voice input and speech recognition applications. Implementations of the present disclosure can also include computer executable instructions, such as program modules executable by a computing device. In some examples, program modules can be defined as routines, programs, objects, components and/or data structures that perform particular tasks and/or that implement particular abstract data types.

Implementations of the present disclosure are discussed in further detail below with reference to an example context. The example context is directed to the insurance industry and includes an insurance customer providing information to a claims agent in an effort to make an insurance claim. Example insurance claims can relate to vehicle, home and business claims among others. It is appreciated, however, that implementations of the present disclosure are readily applicable in other contexts.

In some examples, an insurance claim can be defined as a property-specific claim filed by a customer. In some examples, a customer can include a private person, a service agency or a company. Referring to FIG. 1 each of the users 118, 120, 122 can be customers of an insurance company, the user 114 being a claims agent of the insurance company. In some examples, each of the users 118, 120, 122 can contact the insurance company, and can be directed to the claims agent 114, over the respective communication devices 106, 108, 110, the network 112 and the user workstation 102. In some examples, a property-specific claim can be provided in an electronic data file, and can include client related information, a description of the property, the location of the property during an event, the time of the event, and/or other relevant information or evidence associated to the property. Consequently, the claim could include multiple keywords belonging to particular categories. In some examples, the insurance claim can be retrieved by the user 114. For example, the user 114 can be contacted by phone by a client 118, 120 or 122 who wishes to file an insurance claim. The user 114 can use the computing device 124 to input the claim. The computing device 124 can send claim information to the server system 104 over the network 112. The server system 104 can process the claim information to retrieve the categories and associated context sources. In some implementations, a domain vocabulary defining the categories and features of context information can be stored in and/or otherwise accessed by the server system 104. The server system 104 can generate a confidence score for the claim and or a plurality of claims and can provide the confidence score over the network 112 for display on the computing device 124. The server system 104 can identify one or more actions and can provide the one or more actions for display on the computing device 124. The user 114 can select an action appropriate for the processed claim.

Figure 2:
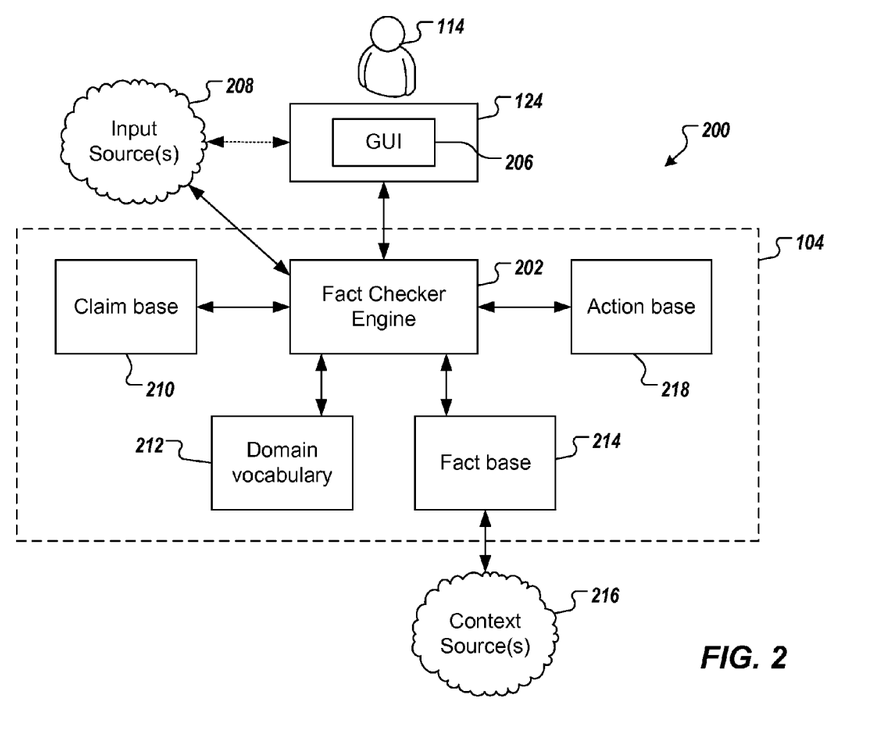
FIG. 2 depicts an example fact checker system in accordance with implementations of the present disclosure.

FIG. 2 depicts an example fact checker system 200 in accordance with implementations of the present disclosure. In the depicted example, the fact checker system 200 includes a fact checker engine 202, a GUI 206, a claim base module 210, a domain vocabulary module 212, a fact base module 214, and an action base module 218. In some examples, the GUI 206 is provided by one or more computer-executable programs executed on a computing device. For example, the computing device 124 of FIG. 1 can display the GUI 206 to the user 114. In some examples, one or more input sources 208 are included to provide input to the fact checker system 200. Example input sources 208 can include digital content channels (e.g., chat, email and/or transfer protocols used to communicate digital content). In some examples, and as discussed in further detail below, one or more context sources 216 can be accessed by the fact checker system 200.

In some examples, one or more components of the fact checker system 200 can be provided on a server system and/or a computing device. In some examples, each of the components of the fact checker system 200 can be provided as one or more computer-executable programs and/or one or more data stores. For example, and as discussed above, the GUI 206 can be provided on a computing device (e.g., the computing device 124 of FIG. 1). In some examples, each of the fact checker engine 202, the claim base module 210, the domain vocabulary module 212, the fact base module 214 and the action base module 218 can be provided by one or more server systems, such as the server system 104 of FIG. 1.

In some implementations, the fact checker engine 202 can be provided as a central component of the fact checker system 200, and can communicate with the other components of the fact checker system 200 during claim processing. In some examples, the fact checker engine 202 can communicate information between the modules 210, 212, 214, 218 as well as the GUI 206.

In some implementations, and in the example context, the user 114 can communicate with a customer (e.g., one or more of the users 118, 120, 122) regarding an insurance claim and can input claim information into the computing device 124 using the GUI 206. In some implementations, claim information can be automatically retrieved. For example, policy information (e.g., name of policy holder, policy number, policy terms, address associated with policy holder, etc.) associated with the particular customer can be retrieved from computer-readable memory (e.g., the data store 132 of the server system 104). In a recurring example, a customer can contact the insurance company regarding a claim for damage to an automobile that was damaged by a hail storm. In the recurring example, the claim can include that the hail storm occurred around 3PM on Dec. 12, 2012 in Brunswick, Ga.

In some implementations, the user 114 interacts with the fact checker system 200 through the GUI 206. In some examples, and as discussed in further detail herein, the user 114 can use the GUI 206 to enter and/or retrieve claim information, to view context information relating to a claim, to schedule actions and/or to assess the credibility of the claim information.

In some implementations, the claim base module 210 provides a searchable record of one or more customer conversations. For example, the claim base module 210 can provide a searchable record of each claim made by a customer, where the claim is recorded and coded according to a domain vocabulary provided in the domain vocabulary module 212, discussed in further detail below. In some examples, the claim is provided based on information provided from the user 114 and/or the input sources 208. In some examples, claim information that makes up a claim can be provided from a conversation that is transcribed by the user using text input via the computing device. In some examples, the claim information can be provided by other means (e.g., direct audio-to-text conversion).

In some examples, the claim base module 210 includes original text and coded text for each claim provided therein. In some examples, the claim base module 210 is provided as one or more computer-executable components and a database stored in computer-readable memory. By providing a searchable record of a customer conversation, the claim base module 210 enables the user 114 to engage in the conversation with the customer instead of mechanically following a preconfigured script. Further, recording and search functions of the enable the user 114 to quickly persist and revisit customer statements and other claim information as the conversation proceeds. In some examples, and as discussed in further detail herein, claim information can be displayed and sorted according to important categories or timestamp.

In some implementations, the claim base module 210 can be realized using one or more components that capture, convert, extract and administrate claim information provided from one or more input channels (e.g., the GUI 206, the input sources 208). As discussed herein, example channels can include manual text entry and/or or automated voice recordings of conversations. Information can be automatically extracted from the stream of incoming information and persisted in a searchable format in the claim base module 210. In some examples, an administration component provides basic administration features (e.g., database configuration).

In some examples, a capture component of the claim base may communicate with different input sources to receive continuous updates. In some examples, the capture component can include a message subscription that enables the capture component to register with different input sources to receive continuous updates in the form of messages. In some examples, the capture component can poll the input sources for updates in regular intervals and/or subscribe to notifications depending on the nature of the input sources.

In some examples, a conversion component of the claim base module 210 enables conversion of data (e.g., data provided in messages received from respective input sources). In some examples, messages can include textual data, image data and/or audio data. In some examples, data could be converted from supported external formats (e.g., audio, text, images) into an internal format (e.g., mark-up). In some examples, a plug-in mechanism can be provided to register different content converters (e.g., optical character recognition (OCR) for image data, voice recognition for audio data).

In some examples, a feature extraction component of the claim base module 210 can reduce the data extracted from received messages to statements about features and values based on the domain vocabulary. In some examples, different feature extraction algorithms can be registered using a plug-in mechanism. The output of feature extraction can be a record including the date at which an event related to the claim occurred, one or more recognized features, and/or the value of each of the one or more recognized features. In some implementations, the claim base module 210 can create multiple records per message. The administration component of the claim base may provide basic administration features such as database configuration.

In some implementations, the domain vocabulary module 212 is provided in a data store and defines the categories and features of context information processed by the fact checker system 200. In some examples, a domain vocabulary provided by the domain vocabulary module 212 includes a database of keywords grouped in categories corresponding to a particular industry, application, and/or domain. In some examples, the domain vocabulary module 212 includes an administration and maintenance interface providing basic functions for creating, removing, updating, and editing categories and features. In some implementations, categories are provided as groups of features. For example, customer identity can be a category. In some examples, features are aspects of a category and support a range of permissible values. For example, a customer address can be an aspect of a customer identity. In some examples, permissible values for an address must contain a valid street address and postcode. In some implementations, the domain vocabulary module 212 provides a persistence and search mechanism for categories and features. A configuration option enables the registration of different persistence and search implementations.

In some implementations, keywords of claims stored in the claim base can be extracted using the domain vocabulary. In some examples, the domain vocabulary can include definition of terms, a range of permissible values of terms, and the categories to which terms are associated. In some implementations, the domain vocabulary can be populated by an expert according to industry (e.g., insurance, utilities, public sector) and domain (e.g., direct sales, after sales, technical support). In some examples, an editable default domain vocabulary can be provided. For example, the term "burn" can exist in the domain vocabulary of an insurance company indicating a fire disaster; but in the vocabulary of a computer industry the term "burn" could have a different meaning (e.g., storing data on a compact disk (CD)).

In some implementations, the fact base module 214 provides unified access to facts relating to a claim. In some examples, each time a claim is entered, the fact base module 214 retrieves matching facts for all keywords and/or categories identified in the claim. In some examples, retrieved facts are coded based on the domain vocabulary provided in the domain vocabulary module 212. In some examples, the fact base module 214 can generate one or more queries based on claim information, keywords and/or categories associated with a claim and can submit the one or more queries to one or more of the context sources 216. In response to the one or more queries, the fact base module 214 receives information from one or more context sources to identify one or more facts that can be used to evaluate the accuracy of claims received from the customer. In some examples, the fact base module 214 is provided as one or more computer-executable components and a database stored in computer-readable memory. In general, the fact base module 214 unifies access to and search of relevant context sources. In this manner, the cost of and delays in decision-making can be reduced, because the user is able to find and use information that might have previously only been accessible to specialized staff. In some instances, the users can make decisions at the point of interaction (e.g., the call center) instead of having to relay the customer to a centralized back office function.

In some implementations, the fact base module 214 can be realized using one or more components that capture, convert, and store context information extracted from the context sources 216. In some examples, an administration component provides basic administration features (e.g., database configuration).

In some examples, a message subscription component can subscribe to and monitor each of the context sources 216. In some examples, a message conversion component enables conversion of data (e.g., data provided in messages received from respective input sources). In some examples, messages can include textual data, image data and/or audio data. In some examples, data could be converted from supported external formats (e.g., audio, text, images) into an internal format (e.g., mark-up). In some examples, a plug-in mechanism can be provided to register different content converters (e.g., optical character recognition (OCR) for image data, voice recognition for audio data).

In some examples, a feature extraction component of the fact base module 214 can reduce the data extracted from received messages to statements about features and values based on the domain vocabulary. In some examples, different feature extraction algorithms can be registered using a plug-in mechanism. The output of feature extraction can be a record including one or more facts and data underlying the facts. For example, a fact can include the occurrence of a hail storm and data underlying the fact can include the date, approximate time, approximate duration and approximate location of the hail storm.

In some examples, a confidence calculation component of the fact base module 214 can provide a confidence score associated with the received claim information. In some examples, the confidence score can reflect a confidence in the accuracy of the claim information provided from the customer. In some examples, the confidence calculation component can match selected records from the claim base against records currently contained in the fact base. In some implementations, the matching algorithm of the fact base can include the timestamp of records, the features, to which records relate and the values of these features. In some examples, the confidence score can be provided as a probability based on the percentage of claims confirmed by facts for a given category, a relative weighting of the claims per category, and a relative trustworthiness of the context source.

In some implementations, the context sources 216 can be provided as structured or unstructured data sources that can accessed by the fact checker system 200 to retrieve facts. In some examples, facts can be retrieved from context sources, which can be internal to an organization (e.g., ERP, CRM, SRM) and/or external information sources, such as meteorological data providers, providers of financial or company data, news services, and unstructured content published by social media platforms. For example, a data source can include a weather web site that can provide weather information for a location based on a specified date and time. In some implementations, the fact base module 214 can retrieve and aggregate facts in defined intervals.

In some implementations, the action base module 218 provides self-contained actions that can be executed by the user in a particular context. In some examples, the actions are registered in the system and can be invoked by means of a service invocation runtime (e.g., supporting REST, SOAP, or RFC). In some examples, the action base module 218 can identify one or more relevant actions that can be executed based on information provided from the fact checker engine 202, and the one or more actions can be displayed to the user in the GUI 206. In some examples, the user can select actions displayed within the GUI 206. In some examples, the action base can include a registry of actions encapsulated as software services and a recommendation mechanism that proposes or enforces actions in a given context. In some examples, abstraction mechanisms (e.g., Web Services) can be used to abstract from the underlying infrastructure and can support a variety of protocols (e.g., REST, SOAP, or RFC). In some examples, the action base module 218 is provided as one or more computer-executable components and a database stored in computer-readable memory.

In some implementations, the action base module 218 can be realized using one or more components. In some examples, an endpoint registration component specifies the capabilities and physical execution parameters of a software service implementing a respective action. In some examples, this can include technical information (e.g., availability, network address, service interface, authentication mechanisms) and non-technical information (e.g., authorization models and training requirements). In some examples, a recommendation mechanism component calculates recommended actions for a given context based on the user credentials, the categories for which responses have been provided so far, and/or the confidence score. In some examples, a plug-in mechanism provides the ability to implement and register different recommendation algorithms.

In some implementations, and as introduced above, claim information can be provided to the fact checker engine 202 through the GUI 206 and/or from the input sources 208. For example, the user 114 can input claim information using the GUI 206. In some examples, policy information can be provided through one or more of the input sources 208. For example, a customer can provide a verbal description of the automobile damage and/or digital pictures illustrating the damage. In some examples, the verbal description can be processed using speech recognition algorithms and relevant claim information can be identified. In some examples, digital images can be electronically communicated to the computing device 124 and/or the fact checker system 200.

In some implementations, the claim data (e.g., from the GUI 206 and/or the input sources 208) can be stored in the claim base 210. Claims provided to the claim base can be processed using the domain vocabulary module 212 to identify features (e.g., keywords) and categories associated with the claims. In some implementations, the claim base module 210 provides output to the computing device 124 over the fact checker engine 202 to enable the user 114 to quickly revisit claim information (e.g., customer statements) displayed in the GUI 206. In some examples, the GUI 206 can sort the claim information for display (e.g., based on categories and/or timestamps).

The domain vocabulary module 212 receives claim information from the fact checker engine 202 to identify the keywords in a claim and their corresponding categories, as described in detail above. In the context of the recurring example, a keyword that could be extracted from the filed claim using the domain vocabulary can include "automobile," which can be categorized as "property."

In some implementations, the fact base module 214 receives input from the fact checker engine 202 to verify the validity of a claim. In some examples, and as discussed above, the fact base module 214 retrieves objective information from the context sources 216 to identify one or more facts. For example, a context source 216 relevant to the recurring example can provide hourly meteorological information for Brunswick, Ga. for Dec. 12, 2012. The fact base module 214 can compare the claim information (e.g., hails storm at 3PM on Dec. 12, 2012 in Brunswick, Ga.) to fact data (e.g., provided from a meteorological service) to generate a confidence score in the particular claim information, and/or the overall claim information. The fact base module 214 can provide the probability score for display in the GUI 206 over the fact checker engine 202. Within the context of the recurring example, the confidence score of the claim information regarding the hail storm can be 100%, for example, if the meteorological data indicates that there was indeed a hail storm in Brunswick, Ga. at approximately 3PM on Dec. 12, 2012, can be 0%, for example, if the meteorological data indicates that there was not a hail storm in Brunswick, Ga. at approximately 3PM on Dec. 12, 2012, or can be somewhere between 0% and 100%, if the meteorological data indicates that there was a chance that a hail storm occurred in Brunswick, Ga. at approximately 3PM on Dec. 12, 2012.

The fact checker engine 202 can access the action base module 218 to retrieve one or more actions that can be executed based on the currently provided and fact-checked claim information. In this manner, the user 114 interacting with the computing device 124 over the GUI 206 can execute fast-track actions. For example, the action base module 218 can provide example actions of accepting a claim, determining insurance coverage for the claims, or rejecting the claim. Each action can be displayed in the GUI 206 for user selection.

Figure 3:
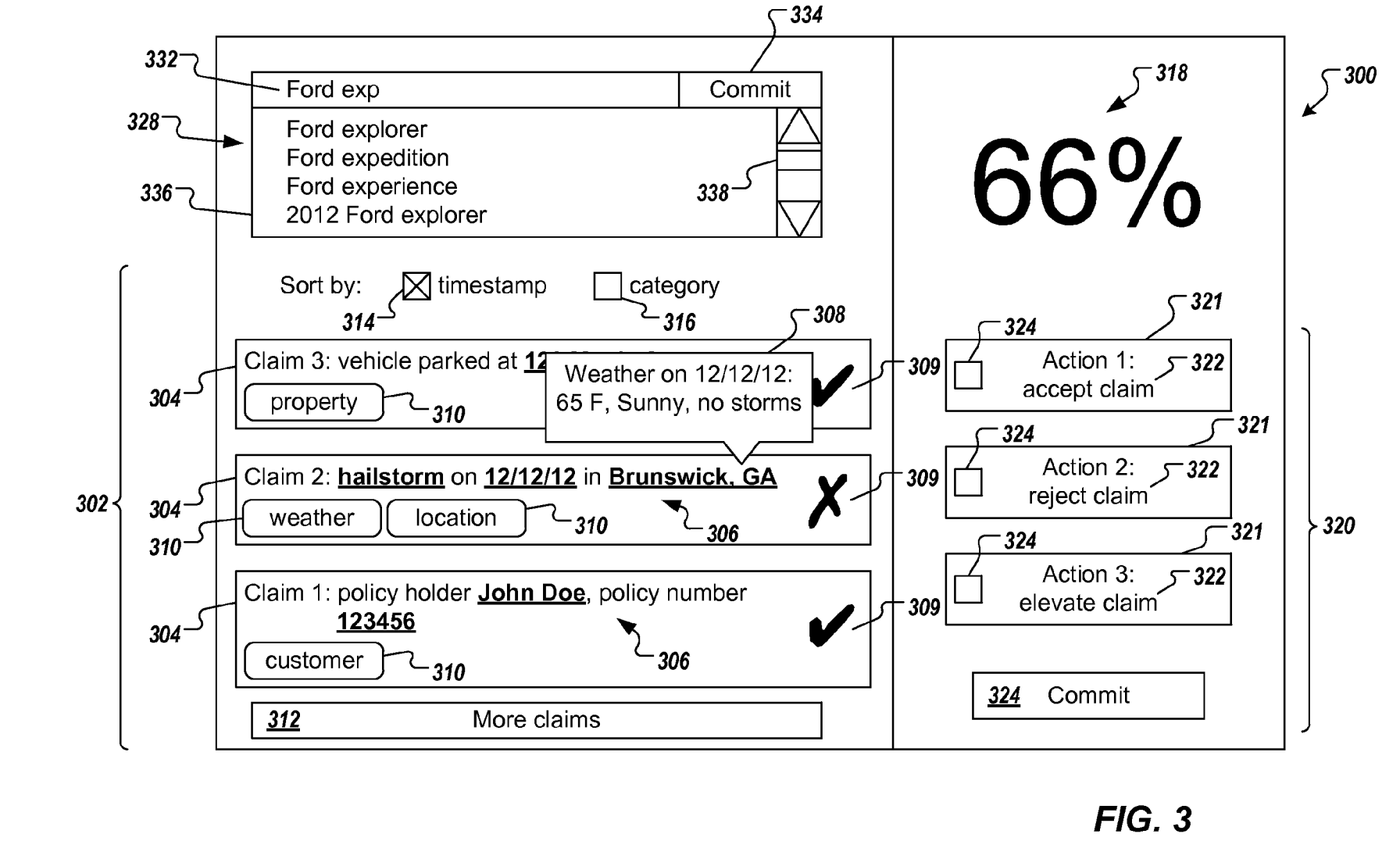
FIG. 3 depicts an example graphical user interface (GUI) for interacting with the fact checker system of the present disclosure.

FIG. 3 depicts an example graphical user interface (GUI) 300 for interacting with the fact checker system of the present disclosure. In some implementations, the GUI 300 can be provided by one or more computer-executable programs that are executed on a computing device (e.g., the computing device 124 of FIG. 1). In some implementations, the GUI 300 displays an itemized list of claims 302, an itemized list of actions 320, a confidence score 318 and a claim input box 328. In some implementations, a user (e.g., the user 114 of FIG. 1) can enter claims using the claim input box 328, the input claims can be processed by a fact checker system (e.g., the fact checker system 200 of FIG. 2), as discussed in detail above, and the claims can be displayed in the itemized list of claims 302. Further, and in response to the input claims, one or more actions can be identified and can be displayed in the itemized list of actions 320, and the confidence score 318 can be calculated and displayed. As new claims are input, the itemized list of claims 302, the itemized list of actions 320 and the confidence score can be updated. It is appreciated, however, that claims can be input from other sources (e.g., the input sources 208 of FIG. 2), as discussed in detail above.

In some implementations, the itemized list of claims 302 can include one or more claim blocks 304, each claim block 304 corresponding to a claim. In the depicted example, each claim block 304 includes a claim displayed as syntax 306. In some examples, one or more keywords can be identified in a claim. In the depicted example, keywords 308 have been identified and are highlighted (e.g., with text highlight color, with special font color, format, bold letters, underline, etc.). In some examples, the user can select a keyword (e.g., by clicking on or hovering a pointer over the keyword) to reveal one or more facts associated with the particular keyword. In the depicted example, a speech bubble 308 displays a fact associated with a claim alleging that a hailstorm occurred on Dec. 12, 2012 in Brunswick, Ga., the fact in this example, disputing the claim.

In some implementations, one or more graphics 309 can be displayed in the claim block 304, each graphic 309 reflecting a confidence level in the particular claim. In the depicted example, a checkmark can indicate that the respective claim is accurate and an X-mark can indicate that the respective claim is inaccurate. For example, the claim that a hailstorm occurred on Dec. 12, 2012 in Brunswick, Ga. can be determined to be inaccurate in view of the fact that the weather in Brunswick, Ga. was sunny with no storms on Dec. 12, 2012. Consequently, an X-mark graphic 309 is displayed in the claim block 304.

In some examples, the claim blocks 304 can also include tags 310 corresponding to one or more categories that have been identified for the respective claims. In some examples, a claim block can display a generic tag, if a category cannot be automatically identified for the particular claim. The user can select (e.g., click on) a generic tag to assign a category to the claim.

In some implementations, a user can select a button 312 (e.g., labeled "More claims") to see more and/or different claim boxes 304. For example, space in the GUI 300 for displaying claim blocks 304 can be limited. Consequently, only a certain number of claim blocks 304 can displayed in the GUI 300 at a given time. In some implementations, sorting options 314, 316 can be provided to define an order in which the claim blocks are displayed. Although example sorting parameters (e.g., sort by timestamp, sort by category) are displayed additional or other sorting parameters can be provided. In the depicted example, the claim blocks 304 are displayed in descending order based on time (e.g., most recently received claim is displayed at the top of the itemized claim list 302)

In some implementations the GUI 300 can display the confidence score 318, which could guide the user in selecting the appropriate actions, as described in detail above. In some examples, the confidence score 318 can be calculated based on a number of claim determined to be accurate. In the depicted example, it is determined that "Claim 1" and "Claim 3" are determined to be accurate, while "Claim 2" is determined to be inaccurate. Consequently, the confidence score of 66% can reflect the fact that two-thirds of the currently provided claims have been determined to be accurate.

In some implementations, the itemized list of actions 320 can include one or more action blocks 321. In some examples, each action block 320 represents an action that the user is able and/or authorized to initiate execution of based on the currently provided claims, facts and/or confidence score. In the depicted example, each action block includes an action displayed as a syntax 322 and a checkbox 324. In some examples, the syntax 322 indicates the determined authorized action and the user can select a checkbox 324 within one or more action blocks 321. In some examples, after selecting one or more actions using the included checkboxes 324, the user can initiate execution of the respective actions by clicking a commit button 326.

In some implementations, the claim input block 328 enables the user to input claim information based on, for example, an on-going conversation with a customer. In some examples, the claim input block 328 includes an input box 332 and a commit button 334. In some examples, the user can input claim information into the input box 332 and can commit the claim information as a claim by selecting (e.g., clicking on) the commit button 334. In some examples, text completion can be provided as the user provides input to the input box 332, such that suggested claim information is displayed in a drop-down menu 336. In this manner, the user can select suggested claim information from the drop-down menu 336 to more quickly input claim information to the fact checker system. In some examples, the drop-down menu 336 includes a scrollbar 338 that enables the user to scroll through the suggested claim information.

Figure 4:
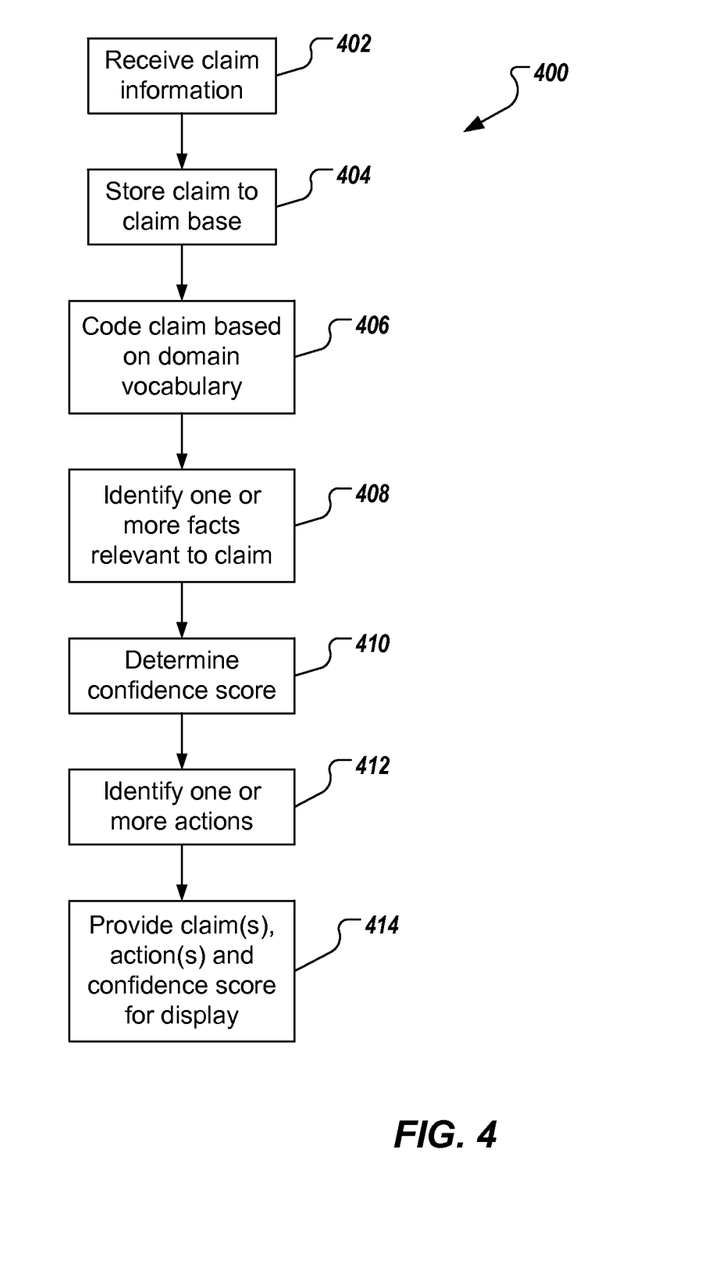
FIG. 4 depicts an example process that can be executed in implementations of the present disclosure.

FIG. 4 depicts an example process 400 that can be executed in implementations of the present disclosure. In some examples, the example process 400 can be provided by one or more computer-executable programs that are executed using one or more computing devices (e.g., the computing device 124 and/or the server system 104 of FIG. 1.

Claim information is received (402). For example, claim information can be input by one or more input sources (e.g., the GUI 206 and/or the input sources 208 of FIG. 2) and can be received by a fact checker system (e.g., the fact checker system 200 of FIG. 2). A claim is generated based on the claim information and is stored in a claim base (404). For example, the fact checker engine 202 can generate the claim based on the received claim information and can provide the claim for storage in a claim base of the claim base module 210. The claim is coded based on a domain vocabulary (406). For example, the claim information can be processed by the domain vocabulary module 212 to identify one or more keywords and/or one or more categories based on the domain vocabulary. The one or more keywords and/or the one or more categories can be associated with the claim and can be stored as part of the claim in the claim base.

One or more facts relevant to the claim are identified (408). For example, the fact base module 214 can process the claim information, the one or more keywords and/or the one or more categories associated with the claim to identify one or more facts that are relevant to the claim. In some examples, the one or more facts are retrieved from the one or more context sources. For example, the fact base module 214 can generate one or more queries based on the claim information, the one or more keywords and/or the one or more categories associated with the claim, each of the one or more queries being provided to context source(s). In response to the one or more queries, the context source(s) can provide one or more facts to the fact base module 214. A confidence score is determined (410). For example, the fact checker engine 202 and/or the fact base module 214 can determine the confidence score based on one or more claims and one or more facts. In some examples, the confidence score can be provided as a ratio of a number of accurate claims to a total number of claims. One or more actions are identified (412). For example, the action base module 218 can identify one or more actions based on claim information of one or more claims, one or more facts associated with each of the one or more claims, and/or the confidence score. In some examples, the one or more actions can be identified based on an authorization level associated with the user (e.g., the user 114 of FIGS. 1 and 2). One or more claims, one or more actions and the confidence score are provided for display (414). For example, the one or more claims, the one or more actions and the confidence score can be provided for display in the GUI 206 of FIG. 2.

Implementations of the present disclosure enable customer-facing CSRs to make on-the-spot decisions based on information provided during a customer conversation. In this manner, the quality and efficiency of resolving customer concerns are enhanced, having a positive effect on customer experience and retention. Further, the fact checker system of the present disclosure protects organizations from risk, by checking and providing a confidence level in information provided by a customer, as well as by providing actions that can be executed in view of the provided customer information and the confidence level thereon. Further, implementations of the present disclosure can alleviate a need for use of a script or pre-defined conversation schema during customer-user interactions. Implementations of the present disclosure can reduce delays by enabling users to find and use information that was previously only accessible to specialised staff. In some instances, users can make decisions at the point of interaction (e.g., call center, shopfront) instead of having to relay the customer to a centralised back office function. Implementations of the present disclosure further enable consistent analysis of claims and rapid verification of facts.

Figure 5:
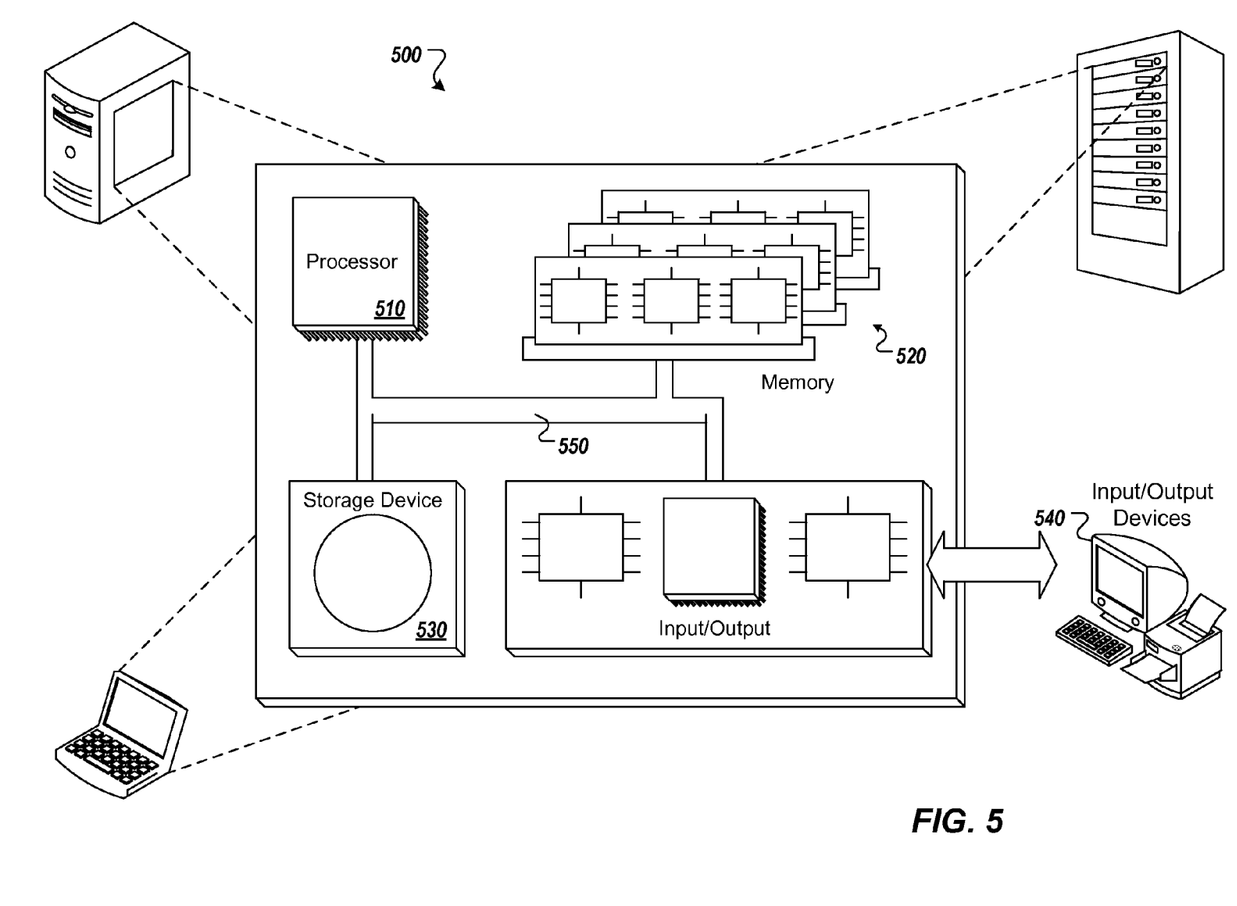
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor receives instructions and data from a read-only memory or a random access memory or both. The essential elements of a computer are a processor for executing instructions and one or more memories for storing instructions and data. Generally, a computer also includes, or is operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatically checking and acting on one or more factual claims, the method being executed using one or more processors and comprising:
    receiving, by the one or more processors, a factual claim comprising claim information and a date corresponding to an occurrence of the factual claim; and
    in response to receiving the factual claim, automatically performing real-time operations comprising:
        processing, by the one or more processors, the claim information based on a domain vocabulary to identify at least one of one or more keywords and one or more categories,
        identifying one or more facts relevant to the factual claim by querying one or more context sources based on the date,
        determining an accuracy of the factual claim based on the one or more facts,
        generating, by the one or more processors, a confidence score reflecting an overall confidence in one or more factual claims based on respective accuracies, and
        transmitting, by the one or more processors, the factual claim and the confidence score for display in a graphical user interface (GUI).

2. The method of claim 1, further comprising:
    identifying one or more actions based on one or more of the one or more factual claims, the one or more facts and the confidence score; and
    transmitting the one or more actions for display in the GUI.

3. The method of claim 2, wherein identifying one or more actions is further based on an authorization level of a user providing the claim information, each action of the one or more actions including an action that the user is authorized to execute.

4. The method of claim 2, further comprising:
    receiving user input indicating selection of at least one action of the one or more actions; and
    in response to receiving the user input, invoking the at least one action.

5. The method of claim 1, wherein identifying one or more facts relevant to the factual claim comprises:
    accessing a fact database based on one or more keywords associated with the factual claim; and
    retrieving the one or more facts from the fact database.

6. The method of claim 1, wherein identifying one or more facts relevant to the factual claim comprises:
    generating one or more queries based on one or more keywords associated with the factual claim;
    querying one or more context sources based on the one or more queries; and
    receiving the one or more facts in response to querying the one or more context sources.

7. The method of claim 1, wherein the claim information is provided from one or more input sources.

8. The method of claim 7, wherein the one or more input sources comprise one or more of a user that inputs the claim information into the GUI, an audio file, an image file, an email message, an instant message and a text message.

9. The method of claim 1, wherein the domain vocabulary provides one or more terms and, for each term of the one or more terms, provides at least one of a definition of the term, a range of permissible values of the term, and a category to which the term is associated.

10. The method of claim 9, wherein processing the claim information based on the domain vocabulary comprises:
    comparing each term provided in the claim information to the one or more terms provided in the domain vocabulary, wherein when a term of the claim information matches a term in the domain vocabulary, the term of the claim information is identified as a keyword.

11. The method of claim 1, further comprising, for each factual claim of the one or more factual claims, transmitting instructions to display the factual claim in the GUI.

12. The method of claim 11, wherein the instructions further comprise instructions to display a graphical representation of the accuracy of the factual claim.

13. The method of claim 11, further comprising transmitting instructions to display at least one fact associated with the factual claim in the GUI.

14. The method of claim 13, wherein the instructions to display at least one fact associated with the factual claim in the GUI are transmitted in response to user input.

15. The method of claim 14, wherein the user input comprises user interaction with the factual claim displayed in the GUI.

16. The method of claim 1, wherein the confidence score is determined as a ratio between a number of factual claims that are determined to be accurate and a total number of factual claims.

17. The method of claim 1, wherein the domain vocabulary is provided in a domain vocabulary module on one or more server systems including the one or more processors.

18. The method of claim 1, wherein identifying one or more facts relevant to the factual claim comprises identifying the one or more facts based on one or more keywords associated with the factual claim that are identified based on the domain vocabulary and the claim information, and wherein determining an accuracy of the factual claim comprises determining the accuracy of the factual claim based on the one or more facts and the claim information.

19. A non-transitory computer-readable storage medium coupled to one or more processors and having instructions stored thereon which, when executed by the one or more processors, cause the one or more processors to perform operations for automatically checking and acting on one or more factual claims, the operations comprising:

receiving a factual claim comprising claim information and a date corresponding to an occurrence of the factual claim; and in response to receiving the factual claim, automatically performing real-time operations comprising:
- processing the claim information based on a domain vocabulary to identify at least one of one or more keywords and one or more categories,
- identifying one or more facts relevant to the factual claim by querying one or more context sources based on the date,
- determining an accuracy of the factual claim based on the one or more facts,
- generating a confidence score reflecting an overall confidence in one or more factual claims based on respective accuracies, and
- transmitting the factual claim and the confidence score for display in a graphical user interface (GUI).

20. A system, comprising:
a computing device; and
a computer-readable storage device coupled to the computing device and having instructions stored thereon which, when executed by the computing device, cause the computing device to perform operations for automatically checking and acting on one or more factual claims, the operations comprising:

receiving a factual claim comprising claim information and a date corresponding to an occurrence of the factual claim; and in response to receiving the factual claim, automatically performing real-time operations comprising:
- processing the claim information based on a domain vocabulary to identify at least one of one or more keywords and one or more categories,
- identifying one or more facts relevant to the factual claim by querying one or more context sources based on the date,
- determining an accuracy of the factual claim based on the one or more facts,
- generating a confidence score reflecting an overall confidence in one or more factual claims based on respective accuracies, and
- transmitting the factual claim and the confidence score for display in a graphical user interface (GUI).

* * * * *